United States Patent

[11] 3,604,991

[72] Inventors Hiroo Yonezu;
Akira Kawaji, both of Tokyo, Japan
[21] Appl. No. 23,631
[22] Filed Mar. 30, 1970
[45] Patented Sept. 14, 1971
[73] Assignee Nippon Electric Company, Limited
Tokyo, Japan
[32] Priority Apr. 1, 1969
[33] Japan
[31] 44/25335

[54] INJECTION-TYPE SEMICONDUCTOR LASER ELEMENT
5 Claims, 3 Drawing Figs.

[52] U.S. Cl. .................................................. 317/235 R,
317/235 N, 317/235 AC, 317/235 AM, 331/94.5
[51] Int. Cl. .................................................. H01l 15/00
[50] Field of Search .......................................... 317/235 N,
235 AC, 235 AM; 331/94.5

[56] References Cited
UNITED STATES PATENTS
3,537,029 10/1970 Kressel et al .................. 331/94.5
OTHER REFERENCES
Pilkuhn, I.B.M. Technical Disclosure Bulletin, vol. 8, No. 1, June 1965, pages 135–136.
Stern; F., I.B.M. Technical Disclosure Bulletin, vol. 8, No. 11, April 1966, page 1655.

*Primary Examiner*—John W. Huckert
*Assistant Examiner*—Martin H. Edlow
*Attorney*—Sandoe, Hopgood & Calimafde ABSTRACT: An injection-type semiconductor laser element is disclosed having an N-type substrate, a $P^1$-type layer having a specified thickness and impurity concentration on the substrate, a highly doped P-type layer on the $P^1$-type layer, and a $P^+$-type layer on the P-type layer. In an alternative device, a P-type layer of a different material and having a larger band gap is placed on the highly doped P-type layer.

INJECTION-TYPE SEMICONDUCTOR LASER ELEMENT

This invention relates generally to semiconductor elements, and particularly to an injection-type semiconductor laser element used for electrophoto energy conversion.

Heretofore, the injection-type semiconductor laser, which is the most important type of semiconductor laser, has been improved in its characteristics as a result of progress in the production techniques of the PN junction. This is particularly remarkable in the field of the gallium arsenide laser diode. However, the step hitherto employed for improving the laser diode characteristics has been the heat treatment of the PN junction carried out by the diffusion or liquid-phase growth. This, however, does not bring about a remarkable improvement, because it does not result from a careful consideration of the performance of the diode. The major shortcoming of the gallium arsenide laser diode, which is one of the typical examples of the injection-type semiconductor laser, is its high threshold current density. This is attributable to: low gain because of the low density of the electrons in the negative temperature state over the luminous region due to the dominant diffusion process; and the high absorption loss due to large absorption in the medium, particularly in the P-region; and the low injection efficiency. As a means for avoiding the first two of these difficulties, a material having a band gap larger than that of gallium arsenide, such as gallium-aluminum-arsenic or gallium-arsenic-phosphor, is epitaxially grown in the vicinity of the PN junction. However, this does not improve the injection efficiency. Rather, it brings about undesired effects on the luminescence, because the heterojunction generates various levels corresponding to the differences of the lattice constant.

It is an object of the present invention to provide a semiconductor laser element characterized by high gain in the active region, low absorption loss and high injection efficiency.

According to the present invention, an injection-type semiconductor laser element is provided, which comprises: an N-type substrate with an impurity concentration higher than $5\times10^{17}$ cm.$^{13}$; a P$^1$ type layer of 0.5 to 5 microns in thickness with an impurity concentration lower than $1\times10^{17}$ cm.$^{16\ 3}$; a P-type layer on the P$^1$ layer having a thickness in the range between one-half wavelength and the diffusion length of the minority carrier and with the impurity concentration higher than $5\times10^{17}$ cm.$^{13}$, and a P$^+$-type layer on said highly doped P-type layer. Alternatively, a P-type layer of different material having the band gap larger than the P-type material may be placed on the highly doped P-type layer.

The principle of the present invention is based on the utilization of the properties of the injection efficiency and refractive index, both varying according to the impurity concentration and of the electric field generated due to the difference of the impurity concentrations or band gaps. The conventional laser diode contains in the P-type layer the luminous region (active region) of 2 to 3 microns in thickness in contact with the N-type layer. Generally, the impurity concentration of the P-type region is high as compared with that of the N-type region. On the other hand, the luminescence is caused by the recombination of the electrons in the P-type region injected from the N-type region. Therefore, the injection efficiency is inevitably low and the effective current component contributing to the laser action is also small. If a P$^{11}$-type layer of very low impurity concentration is made in contact with the N-type region, the injection efficiency is improved and furthermore the diffusion length of the electron in the P$^1$ layer is increased. The increase of the impurity concentration of the N-type region further improves the injection efficiency. Therefore, efficient luminescence is obtainable by fabricating a P-type region (active region) at the portion of the P$^1$ layer, where the injected charge carriers are still numerous. The width of the active region is chosen to in the order of the diffusion depth of the minority carrier. If a P$^{++}$-type layer, highly impurity-doped region compared with that of the active region or P-type crystal piece having a large band gap (forbidden bandwidth) as compared with that of the active region, is disposed in contact with the active region, a portion of the injected electrons is allowed to pass through the active region without recombination and pulled back due to the electric field existing in the boundary between the active region and the P$^+$ layer or the P-type layer having the large band gap. Consequently, the number of electrons in the negative temperature in the active region increases, resulting in an increase in the gain. On the other hand, since the refractive index of the P$^1$ layer is large, the light rays generated in the active region are shifted to the P$^1$ layer side. Therefore, it dies not it does not suffer the absorption loss in the P$^+$ layer. Also, the absorption loss is slight in the case where the P-type layer having a large band gap is used instead of the P$^+$ layer. Since the absorption in the N-type layer is usually small as compared with that in the P-type layer, its effect can be neglected, as long as the impurity concentration does not exceed the order of $1\times10^{19}$ cm.$^{13}$. Thus, a semiconductor laser element characterized by high gain, low absorption loss and high injection efficiency is obtainable by employing the N-P$^1$-P-P$^+$ or N-P$^+$-P-P type layer structure having a large band gap. The necessary conditions for obtaining the above-mentioned effectiveness are as follows: the impurity concentration of the N-type layer is as high as $5\times10^{17}$ cm.$^{13}$; that of the P$^1$-layer as low as $1\times10^{17}$ cm.$^{13}$; that of the P-type region (active region) as high as $5\times10^{17}$ cm.$^{13}$; that of the P$^+$ layer $1\times10^{18}$ cm.$^{13}$; and that of the P$^+$ layer twice as high as that of the active region. The examples of the crystal of large band gap are the compounds of gallium-aluminum-arsenic and gallium-arsenic-phosphor. The P$^1$ layer should be as thin as possible, to the extent that the tunnel effect and the crystal imperfection do not become appreciable. In practice, the favorable range of layer thickness would be between 0.5 and 5 microns. The thickness of the active region should favorably be in the range between one-half wavelength and the diffusion length of the minority carrier. In the case of gallium-arsenide laser diode, the thickness of the active region is preferably between 0.5 to 2 or 3 microns. As compared with the conventional laser diode, the threshold current density of the diode of the present invention is reduced to about one-half by the improved injection efficiency, to two-thirds by the decreased absorption loss, and to three-fifths by the increased gain. Thus, as a whole, the threshold current density has been decreased to one-fifth.

Now, the present invention will be explained with reference to the accompanying drawing, in which:

FIG. 1a is a cross-sectional view of an embodiment of the present invention:

FIG. 1b is an energy band diagram for illustrating the operation of the embodiment shown in FIG. 1a;

FIG. 2a is a cross-sectional view of another embodiment of the present invention;

FIG. 2b is an energy band diagram for illustrating the operation of the device shown in FIG. 2a;

FIG. 3a is a cross-sectional view of still another embodiment of the present invention; and FIG. 3b is an energy band gap diagram for illustrating the operation of the device shown in FIG. 3a.

Figure 1:
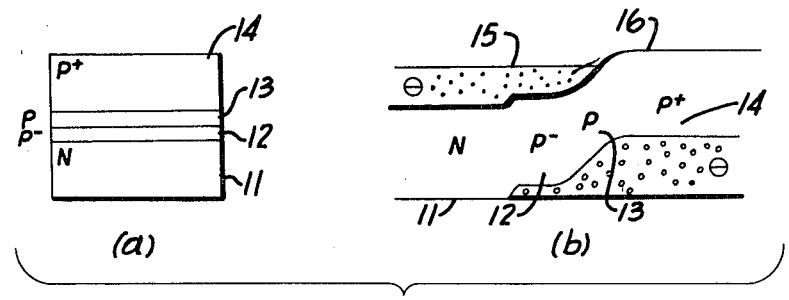

Referring to FIG. 1a, the gallium-arsenide laser diode of the present invention comprises a substrate 11 of N-type gallium arsenide single crystal containing tellurium at a concentration of $3\times10^{18}$ cm.$^{13}$ and a P$^1$-type layer 12 of 2 microns in thickness containing $6\times10^{16}$ cm.$^{13}$ of zinc formed on substrate 11 by means such as a liquid-phase growth method. A 2-micron-thick P-type region of layer formed on P$^1$ layer 12, serving as an active region; and a P$^+$-type layer 14 containing $1\times10^{19}$ cm.$^{13}$ of zinc is fabricated upon layer 13. There are various alternative methods for fabricating P$^1$ layer 12, P-type region 13 and P$^+$ layer 14. An example of such methods is as follows: a mixture of gallium, gallium arsenide (impurity concentration lower than $1\times10^{16}$ cm.$^{13}$) and zinc with the ratio of 4 grams: 300 milligrams: 0.4 milligram is maintained at a temperature of 800° C. for 5 minutes and then cooled down at the rate of 5° C./minute, so that P$^1$ layer 12 may be formed as recrystallization on the surface of the N-type substrate 11. By the time the temperature is lowered by about 5° C., that is, lowered to 795° C., the concentration of zinc in the mixture (solvent) is increased by adding 30 milligrams of zinc. At this time the thickness of the layer 12 is about 4 micron. Once the desired zinc concentration has been reached, growth of the layer 12 turns into the growth of the highly doped P+-type layer 14. The P-type layer 13 of 2 microns in thickness containing the intermediate zinc concentration is obtained by the diffusion of zinc from P+ layer 14 to P¹ layer 12 by the heat treatment of the crystal grown by liquid-phase growth at 900° C. for 2 hours at atmospheric pressure and in the atmosphere of arsenic. This layer corresponds to the active region 13. The layers 13 and 14 can be made by diffusing zinc into P¹ layer 12 or by subjecting it to heat treatment after the completion of the diffusion process, or by using the out-diffusion of zinc if the growth rate of P+ layer 14 is low. The laser diode of the invention is completed by providing a plane reflector on this crystal by way of the cleavage.

FIG. 1b shows the energy level diagram of the element shown in FIG. 1a in operation. The majority of the current is carried by electrons 15 injected from N-type substrate 11, which are rarely subjected to the recombination in layer 12 and recombined in active region 13 to cause luminescence. Moreover, the electrons passing through the active region 13 without being subjected to recombination are pulled back to region 13 due to the effect of an electric field 16 existing in the boundary layer between P-type layer 13 and P+ layer 14, with the result that they are recombined and generate luminescence in region 13. Since the refractive index of P¹ layer 12 is higher than those of P-type layer 13 and P+ layer 14, the generated light shifts to the side of the P¹ layer 12. Therefore, the absorption due to P+ layer 14 is relatively small. The current necessary for the oscillation of the laser element is supplied pulsively at room temperature. The threshold current density, is $1.3 \times 10^4$ A·cm.$^{-2}$.

Figure 2:
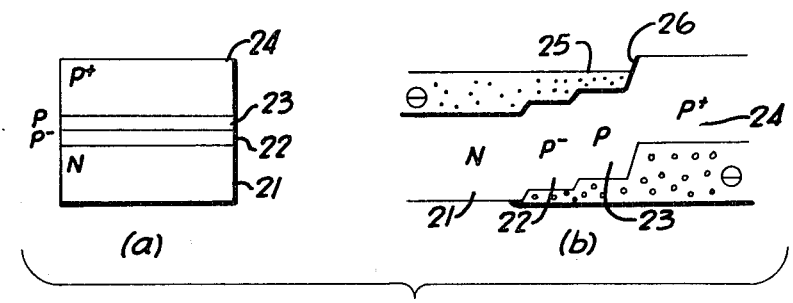

In FIG. 2a, the active region 23 is formed with impurities of arbitrary concentration, whereas the active region 13 in FIG. 1a is formed by the diffusion of zinc from P+layer 14. The element shown in FIG. 2a comprises an N-type gallium arsenide single crystal substrate 21 containing tellurium with a concentration of $3 \times 10^{18}$ cm.$^{-3}$; a p¹layer 22 of 2 microns recrystallized on a substrate 21; a P-type active region 23 grown after adding 5 milligrams of zinc; and a P+layer 24 on grown on region 23 after adding 30 milligrams of zinc. After the completion of the growth process, it may be preferable to subject the element to a heat treatment in order to eliminate the distortion possibly existing in each boundary. This method has the advantage that the impurity concentration in the P-type active region 23 can arbitrarily be controlled.

Referring to FIG. 2b showing the energy level diagram of the element shown in FIG. 2a in operation, electrons 25 injected are recombined and luminesce in the active region 23. A portion of the electrons passing through active region 23 without being subjected to suffering from recombination are pulled back to region due to the electric field 26 existing in the boundary layer between active region 23 and P+layer 24, with the result that they are recombined to generate luminescence in the region 23. Thus, the same effectiveness as the element in FIG. 1b is obtained. The threshold current density of this element in pulsively triggered operation at room temperature is equal to $1.2 \times 10^4$ A·cm.$^{-2}$.

Figure 3:
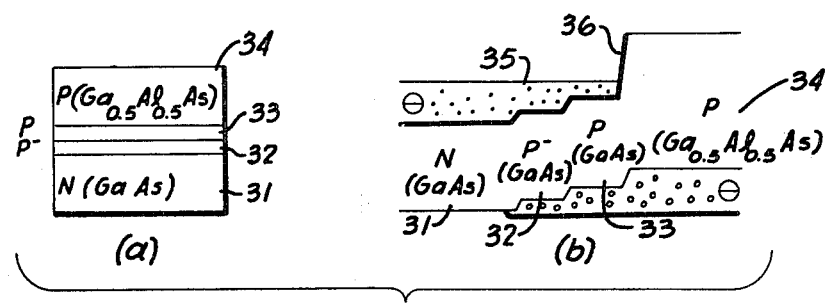

Referring to the embodiment of the invention illustrated in FIG. 3a, a layer 34 of P-type gallium$_{0.5}$· aluminum$_{0.5}$· arsenic instead of P+layer 24 in FIG. 2a is made by the use of a liquid-phase grown process. Upon an N-type gallium arsenide single crystal substrate 31 containing $3 \times 10^{18}$ cm.$^{-3}$ of tellurium, a P¹-layer 32 of 2 microns in thickness and an active region 33 of 2 microns in thickness are formed in the same manner as in the embodiment of FIG. 2a. Furthermore, a layer 34 containing gallium$_{0.5}$· aluminum$_{0.5}$· arsenic is formed on layer 33 by a recrystallization process by cooling at the rate of 5° c./min. the solution containing the solvent including gallium, gallium arsenide, aluminum and zinc with the ratio of 4 grams: 800 MILLIGRAMS: 16 milligrams: 50 milligrams, after maintaining the solution at a maximum temperature of 1,00020 C. The active region 33 may be made, as is mentioned concerning the embodiment of FIG. 1a by the diffusion of zinc from layer 34. It is preferable to subject the crystal to heat treatment to eliminate the distortion possibly existing in each boundary.

FIG. 3b shows the energy band diagram of the element shown in FIG. 3a in operation, which provides the same effectiveness as described in FIG. 1b. Since the electric field 36 is stronger than the electric field 26 in FIG. 2a, the effect for pulling back the injected electrons 35 into the region 33 is large. Also, since the layer 34 is transparent for the light beam generated in he active region 33, the absorption loss is low as compared with the element of FIG. 2a. The threshold current density in pulsively triggered operation at room temperature is $1 \times 10^4$ A·cm.$^{-2}$.

Although description have been given above concerning the gallium arsenide laser diode, it may be any crystal of direct-transition type capable of performing the laser action. Needless to say, the impurity concentration is not limited to those described herein with reference to the disclosed embodiments. The P-type active region may properly be impurity-compensated by N-type impurity, and the fabrication method and the associated conditions are not limited to the one specially described herein. It may be the liquid-phase method or diffusion method or vapor growth method or a combination of these methods. The present invention is applicable to the composite semiconductor laser comprising a plurality of electrodes instead of a simple laser diode.

We claim:

1. An injection-type gallium arsenide semiconductor laser element comprising an N-type single crystal substrate containing N-type impurity at a concentration higher than $5 \times 10^{17}$ cm.$^{-3}$; a P¹-type layer of a thickness between 0.5 and 5 microns formed on said substrate and having an impurity concentration lower than $1 \times 10^{17}$ cm.$^{-3}$; a P-type region formed on said P¹layer containing P-type impurity at a concentration higher than $5 \times 10^{17}$ cm.$^{-3}$, the thickness of said P-type region being in the range between one-half of the lasing wavelength and the diffusion length of minority carriers; a P-type and upper layer formed on said P-type region containing P-type impurity with a concentration higher than $1 \times 10^{18}$ cm.$^{-3}$ an having a band gap larger than that of the substrate, concentration higher than $1 \times 10^{18}$ cm.$^{-3}$ i.e. twice as high as that of said P-type region, and P-type crystal having the band gap larger than that of the substrate materials whereby an electric field established at the boundary of said P-type region and said upper layer causes injected electrons to be returned from said upper layer to said active region for recombination therein.

2. The semiconductor element of claim 1, in which the impurity concentration in said P-type upper layer is approximately twice that of said P-type region.

3. The semiconductor laser element of claim 1, in which said upper layer has a larger band gap than said active region.

4. The semiconductor laser element of claim 4, in which said upper layer is light transparent.

5. The semiconductor laser element of claim 4, in which said upper layer is a compound of gallium-aluminum-arsenic.

UNITED STATES PATENT OFFICE
CERTIFICATE OF CORRECTION

Patent No. 3,604,991          Dated September 14, 1971

Inventor(s) Hiroo Yonezu, et al

It is certified that error appears in the above-identified patent and that said Letters Patent are hereby corrected as shown below:

Column 4, lines 41, 43, 45 and 51, "cm.$^{13}$." should read -- cm.$^{-3}$ -- ; line 44, "p$^1$layer" should read -- P$^-$layer -- ; line 47, after ";" insert -- and -- ; same line, after "P-type" delete "and"; line 49, "cm.$^{13}$ an" should read -- cm.$^{-3}$ and -- ; lines 51 and 52, delete "i.e. twice as high as that of said P-type region and P-type crystal" ; line 52, change "having the" to -- and having a -- ; line 53, after "substrate" cancel "materials" and insert a comma .

Signed and sealed this 10th day of October 1972.

(SEAL)
Attest:

EDWARD M. FLETCHER, JR.          ROBERT GOTTSCHALK
Attesting Officer          Commissioner of Patents